United States Patent
Leu et al.

(10) Patent No.: US 6,569,230 B2
(45) Date of Patent: May 27, 2003

(54) MAGENTA INK JET INK HAVING A HIGH DEGREE OF LIGHT-FASTNESS AND WATER-FASTNESS

(75) Inventors: Yi-Jing Leu, Hsinchu (TW); Chia-Hsin Chien, Taoyuan (TW); Yu-Chang Shen, Taipei (TW); In-Shan Sir, Kaohsiung (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/156,808

(22) Filed: May 30, 2002

(65) Prior Publication Data
US 2003/0001938 A1 Jan. 2, 2003

(30) Foreign Application Priority Data
Jun. 14, 2001 (TW) .......................................... 090114487

(51) Int. Cl.$^7$ ........................ G01D 11/00; C09D 11/00
(52) U.S. Cl. ..................................... 106/31.27; 347/100
(58) Field of Search ...................... 347/100; 106/31.13, 106/31.27

(56) References Cited

U.S. PATENT DOCUMENTS

| | | | | |
|---|---|---|---|---|
| 5,118,350 A | * | 6/1992 | Prasad ..................... | 106/31.58 |
| 5,356,464 A | * | 10/1994 | Hickman et al. ........ | 106/31.36 |
| 5,536,306 A | * | 7/1996 | Johnson et al. .......... | 106/31.49 |

* cited by examiner

*Primary Examiner*—John Barlow
*Assistant Examiner*—Michael S Brooke
(74) *Attorney, Agent, or Firm*—Rabin & Berdo, PC

(57) ABSTRACT

A jet ink of magenta comprising reactive red 180, acid red 52, and reactive red is disclosed in the present invention, wherein the said jet ink of magenta has the advantages of decreasing the color-fading phenomenon due to water exposure and light irradiation. Therefore, the properties of light-fastness and water-fastness are improved greatly, and thus, so is the printing quality.

12 Claims, No Drawings

MAGENTA INK JET INK HAVING A HIGH DEGREE OF LIGHT-FASTNESS AND WATER-FASTNESS

This application incorporates by reference Taiwanese application Serial No. 90114487, filed Jun. 14, 2001.

BACKGROUND OF THE INVENTION

1. Field of the Invention

The invention relates to a jet ink of magenta. More particularly, the invention relates to a jet ink of magenta with the properties of high light-fastness and high water-fastness.

2. Description of the Related Art

In a color ink-jet printer, the jet inks in the cartridges usually consist of cyan ink, magenta ink, and black ink. Recently, some jet inks of lighter color, such as light magenta, light cyan, and light yellow, are also used to make the printed material more colorful.

The colorants of the inks are mainly divided into the two groups of dye and pigment, wherein the former is more suitable for jet inks due to its property of being more hydrophilic to water. However, the dye's more hydrophilic property also results in a weaker water-fastness and a weaker light-fastness, which causes the color-fading phenomenon by photo-chemical reaction, such as photolysis, photo-synthesis, and photo-sensitization. Although the pigment has high water-fastness and light-fastness, it has poor property of color lightness, color hue, color chroma, and particle dispersing, which easily causes the pigment to condense, precipitate, and induce the clogging of the nozzle.

SUMMARY OF THE INVENTION

The object of the present invention therefore is to provide a jet ink of magenta comprising a reactive red 180, an acid red 52, and a reactive red, wherein the properties of light-fastness and water-fastness are improved greatly and thus, so is the printing quality. The contents of the reactive red 180, acid red 52, and reactive red all range from 0.1 wt % to 10 wt %.

The jet ink of magenta further comprises surfactant, humectant, buffer solution, dispersant, binder, chelating agent, biocide, UV-blocker and water, wherein the surfactant is selected from the group consisting of anionic type, nonionic type, cationic type, and amphoteric type, and its content is less than 20.0 wt %, preferably in the range from 0.1 wt % to 15.0 wt %. The content of humectant is less than 20.0 wt %, preferably in the range from 10 wt % to 20 wt %, and the humectant is a low volatile liquid, such as glycol, ethylene glycol and diethylene glycol. The content of water is about 50.0 wt % to 95.0 wt %.

The above objects and other advantages of the present invention will become more apparent from a detailed description of the preferred embodiments of the present invention.

DESCRIPTION OF THE PREFERRED EMBODIMENTS

Colors can be indexed by a color appearance system and a color mixing system. The color appearance system, such as the Ostwald appearance system, Munsell appearance system, and German appearance system, arranges different colors formed on realistic objects. The Munsell appearance system, created by an American painter, defines colors by the three properties of hue, value, and chroma.

The color mixing system generalizes different colors formed by the three primary colors of light, wherein the Commission Internationale de L'Eclairage (CIE) system for measuring colors is the most important system and is used in the present invention. In the CIE system, the color gamut is defined by $L^*$, $a^*$, and $b^*$, which represent the lightness, hue, and chroma of a color, respectively. The hue of a color represented by $a^*$ ranges from green of $-a$ to red of $+a$, and the chroma of a color symbolized by $b^*$ ranges from blue of $-b$ to yellow of $+b$.

Particularly, in the more specific CIELAB system, the square of the color difference represented by $(\Delta E)2$ is the sum of $(\Delta L^*)2$, $(\Delta a^*)2$, and $(\Delta b^*)2$, wherein $\Delta L^*$, $\Delta a^*$, and $\Delta b^*$ are the lightness difference, hue difference, and chroma difference of color, respectively. Therefore, the greater $\Delta E$ indicates a greater difference between the colors.

In the present invention, the jet ink of magenta comprises a reactive red 180, acid red 52, reactive red, surfactant, organic solvent, and water, wherein the contents of the reactive red 180, acid red 52, and reactive red range from 0.1 wt % to 10 wt %. The surfactant is selected from the group consisting of anionic type, nonionic type, cationic type, and amphoteric type, and its content is less than 20.0 wt %, preferably in the range from 0.1 wt % to 15.0 wt %. By adding the surfactant, the surface tension, the humectant property, and the dispersion characteristic are improved, such that the phenomenon of a clogged nozzle is prevented.

The jet ink of magenta further comprises a humectant, UV-blocker, chelating agent, buffer solution, dispersant, binder, biocide, preservative, and so forth, wherein the content of humectant is less than 20.0 wt %, preferably in the range from 10 wt % to 20 wt %. The humectant can prevent the clogging of the nozzle by reducing vaporization, and is a low volatile liquid, such as glycol, ethylene glycol, and diethylene glycol. The content of water is about 50.0 wt % to 95.0 wt %.

Preferred Embodiment

The constituents and the corresponding contents in a jet ink of magenta are shown in Table 1 according to a preferred embodiment of the present invention.

TABLE 1

| Constituent | Content (wt %) |
| --- | --- |
| Reactive red 180 | 3.0 |
| Acid red 52 | 0.5 |
| Reactive red | 0.5 |
| Surfactant | 5.0 |
| solvent | 5.0 |
| others | 5.0 |
| Water | 50.0 ~ 85.0 |

The comparison experiments corresponding to the above preferred embodiment are the jet inks of magenta in the current market, for instance, the magenta cartridge C6578 of HP Corp., the magenta cartridge 1980 of Lexmark Corp., and the magenta cartridge 193 of Epson Corp. The four magenta cartridges including the preferred embodiment described above are respectively supplied to the general jet printer to test the light-fastness property and the water-fastness property.

For the light-fastness test, every magenta cartridge is printed in an ink-jet printing paper (for instance, a Mitsubishi coated paper), on which the effect of light fastness is more easily intensified than general paper. The printed Mitsubishi coated paper is first measured for its properties of color by a spectrophotometer, and then irradiated for 16 hours by a simple emitting machine of Microsol, wherein the irradiation quantity is equivalent to exposing to sunlight for 10 hours per day in three and half months. Next, the irradiated Mitsubishi coated paper is again measured for its properties of color by the spectrometer to obtain the color difference ΔE, as listed in Table 2, wherein the symbols of ⊙, ○, and X correspond to the ΔE ranges of smaller than 3.0, 3.0 to 5.0, and larger than 6.0, respectively. The smaller color difference ΔE indicates the lesser color-fading phenomenon and the better light-fastness property.

TABLE 2

| Experiment | ΔE |
| --- | --- |
| Jet ink of magenta from the present invention | ⊙ |
| Jet ink of magenta C6578 from HP Corp. | X |
| Jet ink of magenta 1980 from Lexmark Corp. | ○ |
| Jet ink of magenta 193 from Epson Corp. | ○ |

For the water-fastness test, the entire paper provided with jet ink of magenta is first measured for its properties of color by the spectrophotometer. Next, the entire paper is dipped in deionized water for a half-hour and is dried naturally at room temperature. Then, the dried paper is again measured for its properties of color by the spectrometer to obtain the color difference ΔE, as listed in Table 3, wherein the symbols of ○, Δ, and X represent the ΔE ranges of 40–50, 50–70, and larger than 70 Irespectively. The smaller color difference ΔE indicates the lesser color-fading phenomenon and the better water-fastness property.

TABLE 3

| Experiment | ΔE |
| --- | --- |
| Jet ink of magenta from the present invention | ○ |
| Jet ink of magenta C6578 from HP Corp. | Δ |
| Jet ink of magenta 1980 from Lexmark Corp. | X |
| Jet ink of magenta 193 from Epson Corp. | Δ |

From the results in Table 2 and Table 3, the jet ink of the present invention has the advantage of reducing the color-fading phenomenon as tested by dipping in water and irradiating with light. Therefore, by combining the reactive red 180, acid red 52, and reactive red, the properties of light-fastness and water-fastness are improved greatly, and thus, so is the printing quality.

Once given the above disclosure, many other features, modifications, and improvements will become apparent to the skilled artisan. Such other features, modifications, and improvements are considered to be a part of this invention, and therefore the scope of the following claims should be accorded the broadest interpretation.

What is claimed is:

1. A magenta ink jet ink comprising:

a reactive red 180;

an acid red 52;

a reactive red; and a medium, said medium is an aqueous liquid.

2. The ink jet ink of claim 1, wherein the content of said reactive red 180 is from 0.1 wt % to 10.0 wt %.

3. The ink jet ink of claim 1, wherein the content of said acid red 52 is from 0.1 wt % to 10.0 wt %.

4. The ink jet ink of claim 1, wherein the content of said reactive red is from 0.1 wt % to 10.0 wt %.

5. The ink jet ink of claim 1, wherein said medium is a material selected from the group consisting of surfactant, humectant, UTV-blocker, chelating agent, buffer solution, dispersant, binder, biocide, preservative.

6. The ink jet ink of claim 5, wherein the content of said surfactant is less than 15 wt %.

7. The ink jet ink of claim 5, wherein the content of said humectant is from 10 wt % to 20 wt %.

8. The ink jet ink of claim 7, wherein said surfactant is a low volatile liquid.

9. The ink jet ink of claim 8, wherein said volatile liquid is ethylene glycol.

10. The ink jet ink of claim 8, wherein said volatile liquid is diethylene glycol.

11. The ink jet ink of claim 8, wherein said volatile liquid is glycol.

12. A magenta ink jet ink comprising:

a reactive red 180;

an acid red 52; and a reactive red.

* * * * *